(12) United States Patent
Schmidt

(10) Patent No.: US 7,752,272 B2
(45) Date of Patent: Jul. 6, 2010

(54) SYSTEM AND METHOD FOR FILTER CONTENT PUSHED TO CLIENT DEVICE

(75) Inventor: David Schmidt, Cambridge (CA)

(73) Assignee: Research In Motion Limited, Waterloo (CA)

( * ) Notice: Subject to any disclaimer, the term of this patent is extended or adjusted under 35 U.S.C. 154(b) by 847 days.

(21) Appl. No.: 11/032,098

(22) Filed: Jan. 11, 2005

(65) Prior Publication Data

US 2006/0155863 A1 Jul. 13, 2006

(51) Int. Cl.
*G06F 15/16* (2006.01)
(52) U.S. Cl. .................. 709/206; 709/229; 709/232
(58) Field of Classification Search .......... 709/229, 709/232, 206
See application file for complete search history.

(56) References Cited

U.S. PATENT DOCUMENTS

| | | | | |
|---|---|---|---|---|
| 5,983,270 A * | 11/1999 | Abraham et al. | ............ | 709/224 |
| 6,732,157 B1 * | 5/2004 | Gordon et al. | ............. | 709/206 |
| 7,249,162 B2 * | 7/2007 | Rounthwaite et al. | ....... | 709/206 |
| 2003/0033212 A1 * | 2/2003 | Sandhu et al. | ............... | 705/26 |
| 2003/0224760 A1 | 12/2003 | Day | | |
| 2004/0042432 A1 | 3/2004 | Riazi et al. | | |
| 2004/0073619 A1 | 4/2004 | Gilhuly et al. | | |
| 2004/0122977 A1 * | 6/2004 | Moran et al. | ................ | 709/246 |
| 2004/0236866 A1 * | 11/2004 | Dugatkin et al. | ........... | 709/235 |
| 2005/0149606 A1 * | 7/2005 | Lyle et al. | ................... | 709/200 |

FOREIGN PATENT DOCUMENTS

WO WO 2004/017583 2/2004

OTHER PUBLICATIONS

Woo T Y C et al—"Providing Internet Services to Mobile Phones: A Case Study with Email" (Sep. 8, 1998) vol. 1 pp. 99-105.
Search Report and Written Opinion issued by the European Patent Office on Mar. 7, 2005, in connection with corresponding European Patent Application No. EP 05100129.

* cited by examiner

*Primary Examiner*—Liangche A Wang
(74) *Attorney, Agent, or Firm*—Gowling Lafleur Henderson LLP

(57) ABSTRACT

A system and method are provided for filtering data be pushed from a server to a communication device in accordance with a set of predefined rules. Data to be pushed to the communication device is received at the server. A content filter engine is used to determine at the server whether the data meets criteria established by the set of predefined rules, the set of predefined rules having been established by a user of the communication device via a user interface. The data is transmitted to the communication device only if the data is not filtered by the set of predefine rules.

9 Claims, 3 Drawing Sheets

SYSTEM AND METHOD FOR FILTER CONTENT PUSHED TO CLIENT DEVICE

The present invention relates generally to a system and method for filtering data pushed to a client device, and specifically to a server-side personal data filter for filtering data in accordance with user specified parameters.

BACKGROUND OF THE INVENTION

Access to information has led to the success of the wireless communication device industry. Handheld wireless devices have successfully introduced portable devices that enable users to have wireless access to features such as electronic mail (e-mail) and the Internet.

Referring to FIG. 1, a communication infrastructure is illustrated generally by numeral 100. The communication infrastructure 100 comprises a plurality of communication devices 102, a communication network 104, a gateway 106, and a plurality of backend services 108.

The communication devices 102 include any wired or wireless device such as a desktop computer, a laptop or mobile computer, a smart phone, a personal digital assistant, such as a Blackberry™ by Research in Motion for example, and the like. The communication devices 102 are in communication with the gateway 106 via the communication network 104. Accordingly, the communication network 104 may include several components such as a wireless network 110, a relay 112, a corporate server 114 and/or a mobile data server (MDS) 116 for relaying messages between the devices 102 and the gateway 106. The gateway 106 is further in communication with a plurality of the backend servers 108. The types of backend servers 108 and their corresponding links will be apparent to a person of ordinary skill in the art.

In the present embodiment, the MDS 116 provides a platform for mobile applications running on wireless, packet-data networks by providing a secure gateway between the wireless network and corporate intranets and the Internet. Further, in the present embodiment the MDS operates as part of the corporate server 114. An example of a corporate server 114 is the Blackberry Enterprise Server provide by Research in Motion. The corporate server 114 provides functions for enabling wireless applications, including network connectivity, encryption, data transcoding, and push support.

Further, the MDS 116 provides communication protocols such Hypertext Transfer Protocol (HTTP) and Transfer Communication Protocol/Internet Protocol (TCP/IP) connections from communication devices 102 to corporate intranets or the Internet. Typically, standard protocols are used to minimize the need to learn or apply new connectivity techniques, and allow new or existing corporate applications to be extended easily to the communication devices 102. However, it will be appreciated that proprietary protocols may also be used.

The MDS 116 performs the necessary address translation to route data between the communication device 102 and IP networks, so the details of addressing between various networks need not be addressed by application developers.

The MDS 116 supports multiple networks and communication devices 102, which enables an organization to deploy and manage its data applications on a single, consistent architecture.

The corporate server 114 provides a secure, private connection between the enterprise and the communication device 102. Using encryption algorithms such as Triple Data Encryption Standard (DES) symmetric key encryption, data flowing between the handheld and the corporate network is fully encrypted. Typically, data is not decrypted at any intermediate point.

Further, the corporate server 114 maintains information about communication device 102 users in the enterprise. Thus for example, push applications can send corporate data to specific users even when they change device, subscriber identity module (SIM) cards, or networks.

As part of the corporate server 114, the MDS 116 uses the same secure architecture. Accordingly, standard HTTP can be used to access a corporate intranet, but sensitive corporate data remains confidential.

As an HTTP proxy and transformation engine, the corporate server 114 can convert and process data that passes between communication device applications and a content server. Using MDS 116, plug-in transcoders can be written to perform custom filtering that delivers content to wireless devices in an efficient and appropriate format.

Lastly, the communication devices 102 can remain continuously connected to the wireless network. Therefore, data can be sent without users having to request it explicitly. This push capability enables wireless enterprise applications that may increase users' productivity and make efficient use of the network.

Typically, the corporate server 114 is responsible for sending new email messages to users' communication devices 102 automatically, while the MDS 116 enables a software developer to write push applications that send new corporate content and alerts to specific users' communication devices 102. Therefore, information can be delivered to the communication devices 102 as it becomes available and users do not have to initiate data exchange and download.

However, one problem faced by most, if not all, of the users of such devices is the limitation and/or cost of bandwidth. Communication across the wireless network 110 can be both slow and costly. Further, another problem is the appropriateness of pushed (and pulled) content. That is, content having no business relevance that is transferred to the communication device 102 often consumes significant resources, including network resources, server resource, and human resources. Accordingly, there is a need for a system and method that limits occupying these resources unnecessarily.

SUMMARY OF THE INVENTION

In accordance with an aspect of the present invention, there is provided a system for filtering data to be pushed from a server to a communication device in accordance with a set of predefined rules, the system comprising: a personal content filter database for storing the set of predefined rules, the set of predefined rules comprising user defined rules received from an associated user via a user interface on the communication device; and a content filter engine for implementing the set of predefined rules by preventing restricted information from being transmitted to the communication device.

In accordance with an aspect of the present invention, there is provided a method for filtering data be pushed from a server to a communication device in accordance with a set of predefined rules, the method comprising the steps of: receiving the data to be pushed to the communication device at the server; using a content filter engine to determine at the server whether the data meets criteria established by the set of predefined rules, the set of predefined rules having been established by a user of the communication device via a user interface; and transmitting the data to the communication device only if the data is not filtered by the set of predefine rules.

BRIEF DESCRIPTION OF THE DRAWINGS

An embodiment of the invention will now be described by way of example only with reference to the following drawings in which.

DETAILED DESCRIPTION OF THE PREFERRED EMBODIMENT

Figure 1:
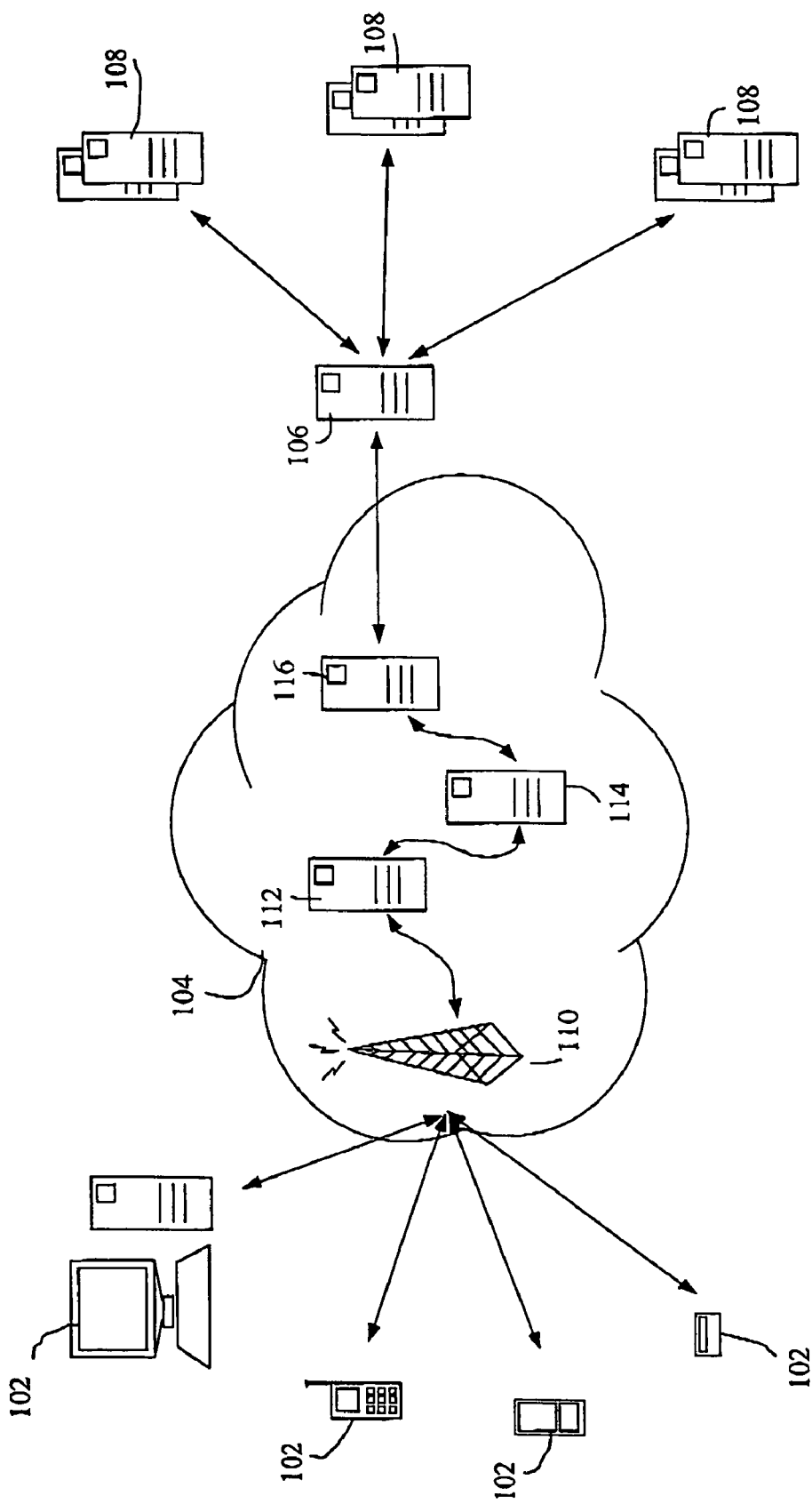
FIG. 1 is a block diagram illustrating a communication infrastructure (prior art)

For convenience, like numerals in the description refer to like structures in the drawings.

Figure 2:
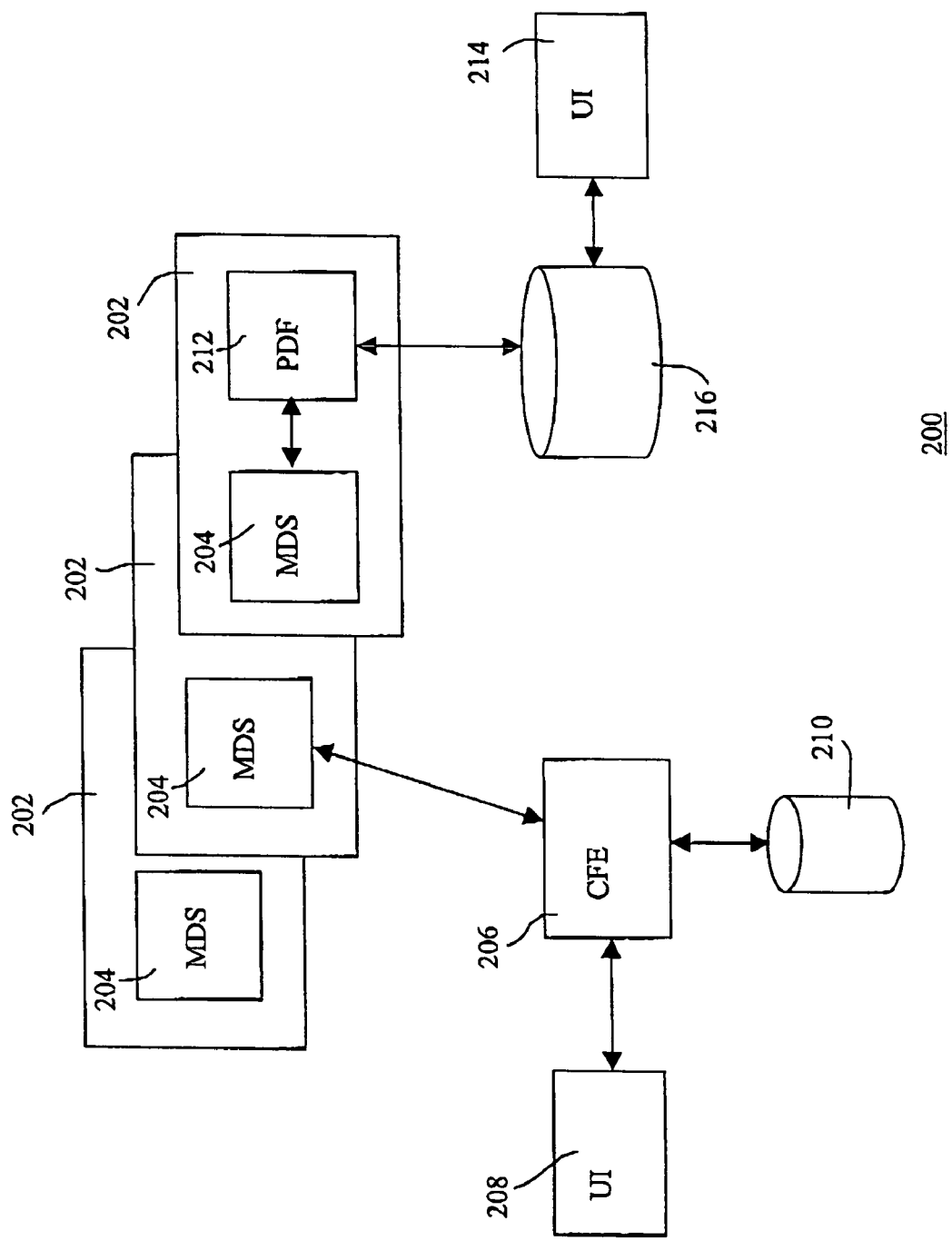
FIG. 2 is a schematic diagram illustrating a corporate server environment in accordance with an embodiment of the present invention.

Referring to FIG. 2, a corporate server environment in accordance with an embodiment of the present invention is illustrated generally by numeral 200. The corporate server environment 200 includes a plurality of corporate servers 202. Each corporate server 202 includes a MDS engine 204, which provides the mobile data service. Further, a content filter engine 206 is provided for filtering data to be transmitted to the communication device 102. An administration user interface 208 is provided for administering the parameters of the content filter engine 206, which are stored in a content filter database 210.

Each corporate server 202 further includes a personal data filter 212 for filtering data transmitted to the communication device 102. Further, an end user interface 214 is provided for administering the parameters of the personal data filter 212, which are stored in a personal content filter database 216.

The content filter engine 206 may comprise proprietary software or a known third party solution embedded into the MDS engine 204. Such third party solutions include Surfcontrol's Web Filter, n2h2's Sentian™, and others, as will be appreciated by a person of ordinary skill in the art.

In order to efficiently embed the content filter engine 206 into the MDS engine 204, Application Programming Interfaces (APIs) are developed for rule execution and administration purposes. The APIs are used to interface the rule language provided by the administration user interface 208 and the end user interface 214 with the rule language provided by the third party content filter engine 206. Therefore, both the user of the communication device 102 and an IT administrator need not use the user interface provided with the third party content filter engine 206.

The content filter database 210 can store extensive lists of blocked Uniform Resource Locators (URLs), categorization of URLS, and dynamic rules-based and/or keyword blocking support, which is implemented by the content filter engine 206. Accordingly, the content filter engine 206 provides the ability for corporate control of the information transmitted to the communication device 102. Typically, corporate controls are implemented and maintained by a company's Information Technology (IT) department and entered into the content filter database 210 via the administration user interface 208. These controls are used to prevent certain types of information from being transmitted to the communication device 102 in accordance with corporate policy.

Furthermore, the content database 210 provides convenient logging support of visited sites that may also be of interest to corporate IT. Therefore, sites accessed frequently, by many users, or deemed useful for business purposes may be cached locally. Such decisions would be policy-based.

Yet further, the filtering concept can be extended to the communication device's user. The personal data filter 212 provides the ability for personal filter policies to be defined and administrated by the user of each communication device 102. That is, each user can set up and modify rules to apply only to their communication device 102. This functionality is provided to the user via the end user interface 214. The rules set up for each user are stored in the personal content filter database 216. The rules are applied by the personal data filter 212, the backbone of which is provided by the content filter engine 206.

In the present embodiment, in the case of a rule stored on the personal content filter database 216 conflicting with a rules stored on the content filter database 210, the latter takes precedence. This feature inhibits the user from overriding corporate policy.

Figure 3:
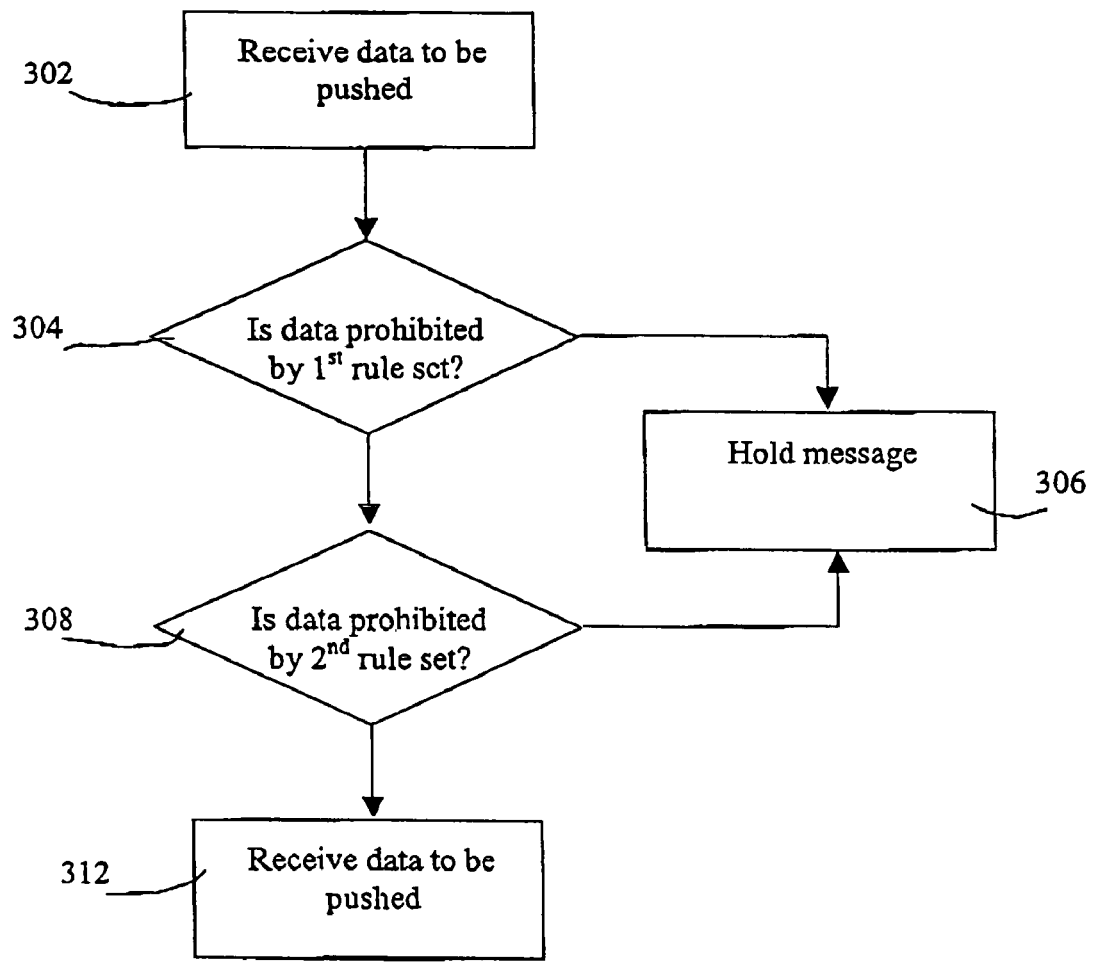
FIG. 3 is flow chart illustrating a method in accordance with an embodiment of the invention.

Referring to FIG. 3, a flow chart illustrating the operation of the filter in accordance with an embodiment of the invention is illustrated generally by numeral 300. In step 302, the MDS 116 receives data to be pushed to a communication device 102. In step 304, the content filter engine 206 compares the data with the rules established by the corporation and stored in the content filter database 210.

If the data comprises content prohibited by one of the stored rules, then the method continues at step 306 and the message is held at the MDS 116. The term content in this instance includes the origin of the data as well as the type of information being transmitted. Such information includes for example, the file type, file size, context of the information, and the like, as will be appreciated by a person of ordinary skill in the art.

Depending on the rules, this data may be discarded or sent to an alternate communication device. For example, if the target communication device is a wireless handheld device, the data may be sent to a personal computer associated with the wireless device instead. Yet further, other rules may be provided which establish a deferred push and/or a confirmation-required push. For the deferred push, data is deferred for a specified length of time, or until a predefined time or condition is reached. At that point, the data is pushed to the communication device 102. For the confirmation-required push, a message is sent to the communication device 102 indicating to the user that data has been received as well as the reason it has not been transmitted. The user is given the option to have the data sent. Other rules will become apparent to a person of ordinary skill in the art.

If the data comprises content that is allowed, the method continues at step 308 and the personal data filter 212 compares the data with the rules established by the user and stored in the personal content filter database 216.

If the data comprises content prohibited by one of the stored rules, then the method continues at step 306 and the message is held at the MDS 116. As previous described, depending on the rules this information may be discarded or sent to an alternate communication device.

If the data comprises content that is allowed, the method continues at step 312 and the data is sent to the communication device 102.

The previous embodiment describes a case where there exists a corporate entity to set and implement corporate policy. However, in some cases individuals not belonging to a corporate entity may subscribe to such services. Accordingly, the filter applied in such cases is the personal data filter 212. Therefore, steps 304 and 306 as described with reference to FIG. 3 are skipped.

Although the content filter engine 206 is described herein as being embedded within the MDS 116, it may also be implemented as a standalone server coupled with the MDS 116, as will be appreciated by a person skilled in the art. Further, although the content filter database 210 and the personal content filter database 216 are illustrated as separate entities in FIG. 2, they may be one and the same as will be appreciated by a person skilled in the art.

Accordingly, it can be seen that the present invention provides the ability to filter data being pushed to a communication device, and it can do so at the server side of the communication system. In this way, general content filter authority is given to the IT administrator and personal content filter authority is given to end users to control their experience. The present invention provides the user goal of controlling the push barrage of data, which is likely to grow exponentially in the years ahead.

Although preferred embodiments of the invention have been described herein, it will be understood by those skilled in the art that variations may be made thereto without departing from the spirit of the invention or the scope of the appended claims.

What is claimed is:

1. A server for filtering data to be pushed to a wireless handheld device in accordance with user defined rules and corporate defined rules, the wireless handheld device included in a network of wireless communication devices, each wireless handheld device of the network of wireless communication devices being associated with a respective end user, the server comprising:
   a personal content filter database for storing end user defined rules, the end user defined rules capable of being set up and modified only by the respective end user associated with the wireless handheld device via an end user interface;
   a content filter database for storing corporate defined rules from a system administrator via an administration interface; and
   a content filter engine for implementing the user defined rules and the corporate defined rules by preventing restricted information from being transmitted to the wireless handheld device;
   wherein the corporate defined rules take precedence over the end user defined rules in case of a conflict, to prevent the end user from overriding corporate policy.

2. The server of claim 1, wherein the server comprises mobile data services and the content filter engine is embedded within the mobile data services.

3. The server of claim 1, further comprising a database for caching information that is accessed frequently by many users.

4. The server of claim 1, further comprising a database for caching information, wherein the information is deemed useful for business purposes.

5. The server of claim 1 wherein the content filter engine transmits the restricted information to an alternate communication device.

6. A method for filtering data be pushed from a server to a wireless handheld device in accordance with a set of predefined rules, the wireless handheld device included in a network of wireless communication devices, each wireless handheld device of the network of wireless communication devices being associated with a respective end user, the method comprising the steps of:
   receiving the data to be pushed to the wireless handheld device at the server;
   using a content filter engine to determine at the server whether the data meets criteria established by the set of predefined rules, the set of predefined rules comprising:
      end user defined rules capable of being set up and modified only by the respective end user associated with the wireless handheld device via an end user interface and stored in a personal content filter database; and
      corporate defined rules established by a system administrator via an administration interface and stored in a content filter database; and
   transmitting the data to the wireless handheld device only if the data is not filtered by the set of predefined rules;
      wherein the further set of predefined rules established by the system administrator supersede the set of predefined rules established by the user of the wireless handheld device in case of a conflict.

7. The method of claim 6, further comprising caching information locally wherein the information is accessed frequently by many users.

8. The method of claim 6, further comprising caching information locally wherein the information is deemed useful for business purposes.

9. The method of claim 6, further comprising transmitting the filtered data to an alternate communication device.

* * * * *